United States Patent
Abuelsaad et al.

(10) Patent No.: US 9,811,808 B2
(45) Date of Patent: Nov. 7, 2017

(54) MEETING NOTIFICATIONS FOR OFFLINE INVITEES

(71) Applicant: International Business Machines Corporation, Armonk, NY (US)

(72) Inventors: Kelly Abuelsaad, Poughkeepsie, NY (US); Kulvir S. Bhogal, Pflugerville, TX (US); Lisa Seacat DeLuca, San Francisco, CA (US); Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 13/765,043

(22) Filed: Feb. 12, 2013

(65) Prior Publication Data

US 2014/0229218 A1 Aug. 14, 2014

(51) Int. Cl.
G06Q 10/00 (2012.01)
G06Q 10/10 (2012.01)
H04L 12/58 (2006.01)
H04L 29/08 (2006.01)

(52) U.S. Cl.
CPC .......... *G06Q 10/1095* (2013.01); *G06Q 10/10* (2013.01); *H04L 51/04* (2013.01); *H04L 67/24* (2013.01)

(58) Field of Classification Search
CPC ...... G06Q 10/109; G06Q 10/10; G06Q 50/01; G06Q 10/107; G06Q 10/1095; H04L 51/04; H04L 67/24
USPC ....................................................... 705/7.19
See application file for complete search history.

(56) References Cited

U.S. PATENT DOCUMENTS

| 6,381,444 B1 * | 4/2002 | Aggarwal et al. ............ 434/350 |
| 6,564,261 B1 * | 5/2003 | Gudjonsson ........ H04L 12/1818 370/261 |
| 7,739,340 B2 | 6/2010 | Arenburg et al. |
| 7,882,243 B2 | 2/2011 | Ivory et al. |
| 8,069,117 B1 * | 11/2011 | Gay ...................... G06F 21/604 705/18 |
| 2002/0035451 A1 * | 3/2002 | Rothermel ........................ 703/1 |
| 2004/0263636 A1 * | 12/2004 | Cutler et al. ............. 348/211.12 |
| 2004/0268265 A1 * | 12/2004 | Berger .................. G06F 1/1622 715/752 |
| 2006/0101143 A1 | 5/2006 | Garcia et al. |
| 2007/0226035 A1 * | 9/2007 | Doss ................ G06Q 10/06314 705/7.19 |

(Continued)

FOREIGN PATENT DOCUMENTS

EP 2093946 A1 8/2009

*Primary Examiner* — Johnna Loftis
(74) *Attorney, Agent, or Firm* — Brian J. Colandreo, Esq.; Jeffrey T. Placker, Esq.; Holland & Knight LLP (57) ABSTRACT

A method, computer program product, and system for providing notifications regarding electronic meetings is described. A set of one or more invitees for an online meeting is received, the set including a first invitee. A first status of the first invitee is identified, the first status indicating unavailability with respect to the electronic meeting. A change in status of the first invitee, after the end of the electronic meeting, to a second status indicating availability with respect to the electronic meeting is identified. A notification of the meeting is provided to the first invitee, based upon, at least in part, identifying the change in status.

20 Claims, 3 Drawing Sheets

(56) References Cited

U.S. PATENT DOCUMENTS

| | | | |
|---|---|---|---|
| 2009/0024433 A1* | 1/2009 | Guardascione | G06Q 10/06 705/7.19 |
| 2009/0094536 A1 | 4/2009 | Keohane et al. | |
| 2009/0165000 A1* | 6/2009 | Gyorfi et al. | 718/102 |
| 2010/0017753 A1 | 1/2010 | Li et al. | |
| 2010/0205539 A1* | 8/2010 | Gestsson | G06Q 10/107 715/752 |
| 2010/0312838 A1* | 12/2010 | Lyon et al. | 709/206 |
| 2011/0130958 A1* | 6/2011 | Stahl et al. | 701/201 |
| 2011/0258013 A1 | 10/2011 | Groves | |
| 2012/0150577 A1* | 6/2012 | Berg et al. | 705/7.12 |
| 2012/0166952 A1* | 6/2012 | Alexandrov et al. | 715/730 |
| 2012/0284640 A1* | 11/2012 | Sloyer et al. | 715/753 |
| 2014/0007245 A1* | 1/2014 | Bank et al. | 726/26 |

\* cited by examiner

MEETING NOTIFICATIONS FOR OFFLINE INVITEES

TECHNICAL FIELD

This disclosure relates to electronic meetings.

BACKGROUND

In various situations, individuals and/or groups may participate in electronic meetings. Electronic meetings may be interactions among individuals facilitated by various electronic means. For example, electronic meeting applications (or processes, and so on) may facilitate speech-, text-, and/or video-enabled communication sessions among a plurality of individuals. In certain instances, electronic meetings may include text-based chat sessions (e.g., instant messaging sessions). In certain instances, administrators (and/or others) may send invitations to attend an electronic meeting to various desired participants. For example, with respect to a meeting utilizing an instant messaging session (e.g., an ad hoc meeting to discuss a project via a group chat facilitated by an instant messaging application) an individual may send an invitation to various other individuals (e.g., using the instant messaging application, a calendar application, or other means) thereby inviting those individuals to participate in the meeting. Individuals may maintain various statuses with regard to availability for text-based chat and/or other electronic meeting functionality. For example, an individual's status may indicate whether she is online, offline, busy, available, and so on (e.g., with respect to particular applications or forms of communication, such as instant messaging).

BRIEF SUMMARY OF THE DISCLOSURE

According to one aspect of the disclosure, a computer-implemented method includes receiving, by one or more computing devices, a set of one or more invitees for an electronic meeting, the set including a first invitee. The method includes identifying, by the one or more computing devices, a first status of the first invitee, the first status indicating unavailability with respect to the electronic meeting. The method includes identifying, by the one or more computing devices, a change in status of the first invitee, after the end of the electronic meeting, to a second status, the second status indicating availability with respect to the electronic meeting. The method includes providing, by the one or more computing devices, a notification of the electronic meeting to the first invitee, based upon, at least in part, identifying the change in status.

One or more of the following features may be included. The electronic meeting may include a text-based chat session. The method may include identifying a request from the first invitee to contact an administrator associated with the electronic meeting, based upon, at least in part, providing the notification of the electronic meeting. The method may include establishing a communication connection between the first invitee and the administrator based upon, at least in part, the request. The notification may include summary information associated with the electronic meeting. The method may include providing one or more files associated with the electronic meeting to the first invitee, based upon, at least in part, identifying the change in status of the first invitee. The one or more files may include a transcript of a portion of the electronic meeting. The method may include providing, to the first invitee, contact information associated with one or more other individuals associated with the electronic meeting, based upon, at least in part, identifying the change in status of the first invitee.

According to another aspect of the disclosure, a computer program product resides on a computer readable storage medium that has a plurality of instructions stored on it. When executed by a processor, the instructions cause the processor to perform operations including receiving a set of one or more invitees for an electronic meeting, the set including a first invitee. The operations include identifying a first status of the first invitee, the first status indicating unavailability with respect to the electronic meeting. The operations include identifying a change in status of the first invitee, after the end of the electronic meeting, to a second status, the second status indicating availability with respect to the electronic meeting. The operations include providing a notification of the electronic meeting to the first invitee, based upon, at least in part, identifying the change in status.

One or more of the following features may be included. The electronic meeting may include a text-based chat session. The operations may include identifying a request from the first invitee to contact an administrator associated with the electronic meeting, based upon, at least in part, providing the notification of the electronic meeting. The operations may include establishing a communication connection between the first invitee and the administrator based upon, at least in part, the request. The notification may include summary information associated with the electronic meeting. The operations may include providing one or more files associated with the electronic meeting to the first invitee, based upon, at least in part, identifying the change in status of the first invitee. The one or more files may include a transcript of a portion of the electronic meeting. The operations may include providing, to the first invitee, contact information associated with one or more other individuals associated with the electronic meeting, based upon, at least in part, identifying the change in status of the first invitee.

According to another aspect of the disclosure, a computing system includes one or more processor devices and one or more memory architectures coupled with the one or more processor devices. The one or more processor devices are configured to receive a set of one or more invitees for an electronic meeting, the set including a first invitee. The one or more processor devices are configured to identify a first status of the first invitee, the first status indicating unavailability with respect to the electronic meeting. The one or more processor devices are configured to identify a change in status of the first invitee, after the end of the electronic meeting, to a second status, the second status indicating availability with respect to the electronic meeting. The one or more processor devices are configured to provide a notification of the electronic meeting to the first invitee, based upon, at least in part, identifying the change in status. The electronic meeting includes a text-based chat session.

One or more of the following features may be included. The one or more processor devices may be configured to identify a request from the first invitee to contact an administrator associated with the electronic meeting, based upon, at least in part, providing the notification of the electronic meeting. The one or more processor devices may be configured to establish a communication connection between the first invitee and the administrator based upon, at least in part, the request. The notification may include summary information associated with the electronic meeting. The one or more processor devices may be configured to provide one or more files associated with the electronic meeting to the first invitee, based upon, at least in part, identifying the change in status of the first invitee. The one or more files may include a transcript of a portion of the electronic meeting. The one or more processor devices may be configured to provide, to the first invitee, contact information associated with one or more other individuals associated with the electronic meeting, based upon, at least in part, identifying the change in status of the first invitee.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Individuals and groups of individuals may communicate with each other in electronic meetings (e.g., as facilitated by one or more electronic meeting applications or processes, and so on). (It will be understood that "meeting" may be used herein interchangeably with "electronic meeting.") Communication via electronic meetings may occur in various ways including, for example, text-based chat communication (e.g., instant messaging). For example, in certain embodiments, multiple individuals may communicate with each other by entering text into a local computing device (e.g., a cell phone, laptop computer, and so on), causing the entered text to be transmitted to computing devices associated with others in the group, and receiving at the local computing device (and/or another device) text that was similarly entered and transmitted. This type (and/or other types) of communication may be facilitated, for example, by an instant messaging (and/or other) application.

In certain instances, it may be useful to provide invitations to electronic meetings. For example, for a planned text-based electronic meeting (e.g., a meeting that will be facilitated by an instant messaging application), an administrator (and/or another individual or process) may formulate an invitation to various individuals to participate in the planned meeting. Such an invitation may be sent by various means (e.g., email, instant message, telephone call, and so on) and may contain various information (e.g., the time of the meeting, the meeting title and/or subject (if any), associated files or other information, a list of invitees, and so on).

Various communication applications (e.g., instant messaging applications) may facilitate individuals adopting/maintaining/etc. various status states (or "statuses"), such as "offline," "online," "busy," "available," and so on. This ability of users to change status (e.g., with respect to the communication mode to be utilized in a particular meeting), may create certain difficulties with respect to the transmission of invitations to electronic meetings, participation in electronic meetings, and other activities. For example, with respect to a text-based electronic meeting (e.g., a meeting facilitated by an instant messaging application), an invitation may sometimes be provided to invitees via a text-based communication application (e.g., the instant messaging application over which the meeting will be conducted). If, however, a particular invitee is currently "offline" with respect to such an application, he may not currently be able to receive such an invitation. (It will be understood that statuses other than "offline" or the like may also indicate unavailability to participate in an electronic meeting and/or receive a meeting invitation. For example, a participant may be "online" with respect to an instant messaging application, but may have set his status to "busy," "do not disturb," or the like, thereby indicating a desire not to receive communications via that application.) As such, a meeting administrator may be presented with a choice between regularly monitoring the status of invitees who were unavailable when an invitation was originally sent (e.g., in order to re-send the invitation once the invitees become available) or accepting that some invitees who are not available when an invitation is first sent may not be appropriately invited to and/or otherwise notified of the meeting once they become available again. Similarly, an invitee to a particular meeting who was previously unavailable may sometimes not become available (e.g., change his instant messaging application status from "offline" or "busy" to "online" or "available") until after the particular meeting has ended. It may be difficult, therefore, to provide notifications and/or other information relating to the meeting to such an invitee without an administrator expending significant effort and/or resources to monitor the invitee's status (including after the meeting may have ended) and initiate various types of communication regarding the meeting once the invitee becomes available.

Accordingly, it may be useful to implement a process (or application, and so on) that may identify a change in status of a meeting invitee from unavailable (e.g., "offline" or "busy") to available (e.g., "online" or "available"), including, for example, when such a change occurs after the relevant meeting has ended. Likewise, it may be useful to implement a process (or application, and so on) that may provide invitations, notifications, and/or various other information regarding an electronic meeting based upon identifying an availability-related status of an invitee (e.g., based upon identifying that an invitee's status has recently changed from "offline" or "unavailable" to "online" or "available"). A meeting notification ("MN") process (or application) may provide this and/or various other functionality.

Figure 1:
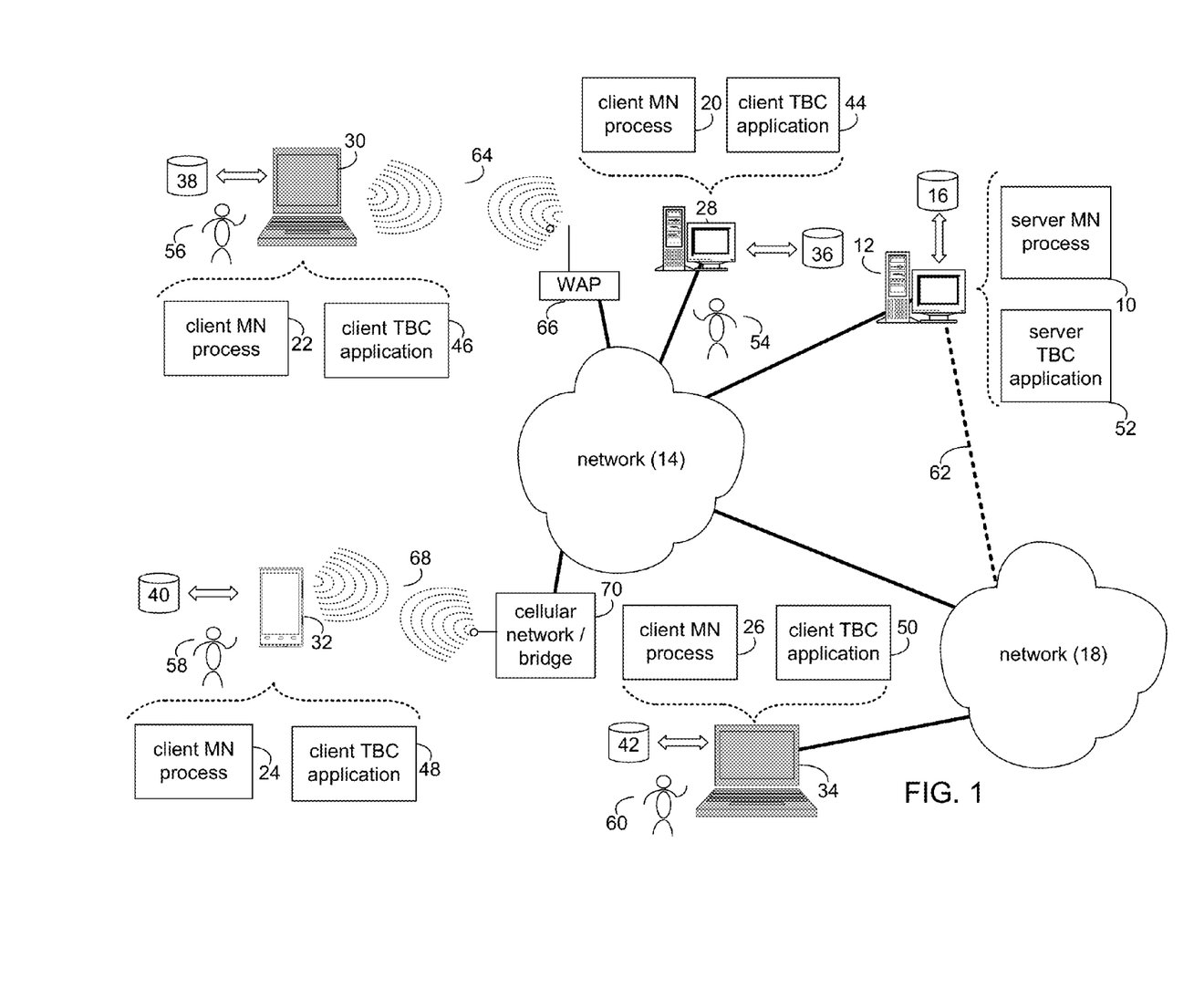
FIG. 1 is a diagrammatic view of a meeting notification process coupled to a distributed computing network.

Referring now to FIG. 1, an MN process may be coupled to a computer or computer network. For example, server MN process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server MN process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademark of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client MN processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client MN processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the MN process may be a server-side process (e.g., which may be implemented via server MN process 10), in which all of the functionality of the MN process may be executed on a server computer (e.g., server computer 12). In an embodiment, the MN process may be a client-side process (e.g., which may be implemented via one or more of client MN processes 20, 22, 24, 26), in which all of the functionality of the MN process may be executed on a client computing device (e.g., one or more of client electronic devices 28, 30, 32, 34). In an embodiment, the MN process may be a hybrid server-client process (e.g., which may be implemented by server MN process 10 and one or more of client MN processes 20, 22, 24, 26), in which at least a portion of the functionality of the MN process may be implemented via server computer 12 and at least a portion of the functionality of the MN process may be implemented via one or more client computing devices (e.g., one or more of client electronic devices 28, 30, 32, 34).

In certain embodiments, an MN process may be a stand-alone process. In certain embodiments, an MN process may operate as part of, or in conjunction with, one or more other processes and/or may include one or more other processes. For example, in certain embodiments, an MN process may be included in (or may operate in conjunction with) a electronic meeting ("EM") application (or process) such as a text-based chat ("TBC") application (or process) (e.g., an instant messaging application or process). An EM application may generally facilitate electronic communication among multiple participants in an electronic meeting. An EM application may be a stand-alone application or may be part of and/or interoperate with various other applications (e.g., an email application). A TBC application may generally facilitate text-based communication among multiple participants in an electronic meeting. For example, a TBC application may facilitate communication through an instant messaging interface. A TBC application may be a stand-alone application or may be part of and/or interoperate with various other applications (e.g., an email application).

An EM application (or process) may operate (and/or reside) on a client device (e.g., client TBC application 44, operating on client electronic device 28; client application TBC 46, operating on client electronic device 30; client TBC application 48, operating on client electronic device 32; or client TBC application 50, operating on client electronic device 34). A client MN process (e.g., client MN process 20) or a server MN process (e.g., server MN process 10) may be in communication with a client EM application (e.g., client TBC application 44) or may be part of a client EM application.

An EM application may additionally/alternatively operate (and/or reside) on a server device (e.g., server TBC application 52, operating on server computer 12 or another server TBC application (not shown), operating on another server computer (not shown)). A server MN process (e.g., server MN process 10) or a client MN process (e.g., client MN process 20) may be in communication with a server EM application (e.g., server TBC application 52) or may be a part of a server EM application.

Users 54, 56, 58, 60 may access an MN process in various ways. For example, these users may access server MN process 10 directly through the device on which a client process (e.g., client MN processes 20, 22, 24, 26) is executed, namely client electronic devices 28, 30, 32, 34. Users 54, 56, 58, 60 may access server MN process 10 directly through network 14 and/or through secondary network 18. Further, server computer 12 (i.e., the computer that executes server MN process 10) may be connected to network 14 through secondary network 18, as illustrated with phantom link line 62.

Users 54, 56, 58, 60 may also access a client or server EM application (or process) in various ways. For example, users 54, 56, 58, 60 may access server TBC application 52 directly through the device on which a client application (e.g., client TBC applications 44, 46, 48, 50) is executed, namely client electronic devices 28, 30, 32, 34. Users 54, 56, 58, 60 may access server TBC application 52 directly through network 14 and/or through secondary network 18. Further, server computer 12 (i.e., the computer that executes server TBC application 52) may be connected to network 14 through secondary network 18, as illustrated with phantom link line 62. Users 54, 56, 58, 60 may also access a client TBC application (or process) in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client MN process 20 will be described for illustrative purposes. It will be understood that client MN process 20 may, for example, interact and/or communicate with a server MN process such as server MN process 10 and/or may be executed within one or more applications that allow for communication with other server and/or client MN processes. This is not intended to be a limitation of this disclosure, as other configurations are possible (e.g., MN process 20 may include stand-alone client processes and/or stand-alone server processes). For example, some implementations may include one or more of client MN processes 22, 24, 26 or server MN process 10 in place of or in addition to client MN process 20. Similarly, although many examples below relate to text-based chat communication (e.g., instant messaging or other TBC applications and/or functionality), it will be understood that this is not intended to be a limitation of the disclosure, as MN process 20 (or another MN process) may provide functionality with respect to various types of electronic meetings.

Figure 2:
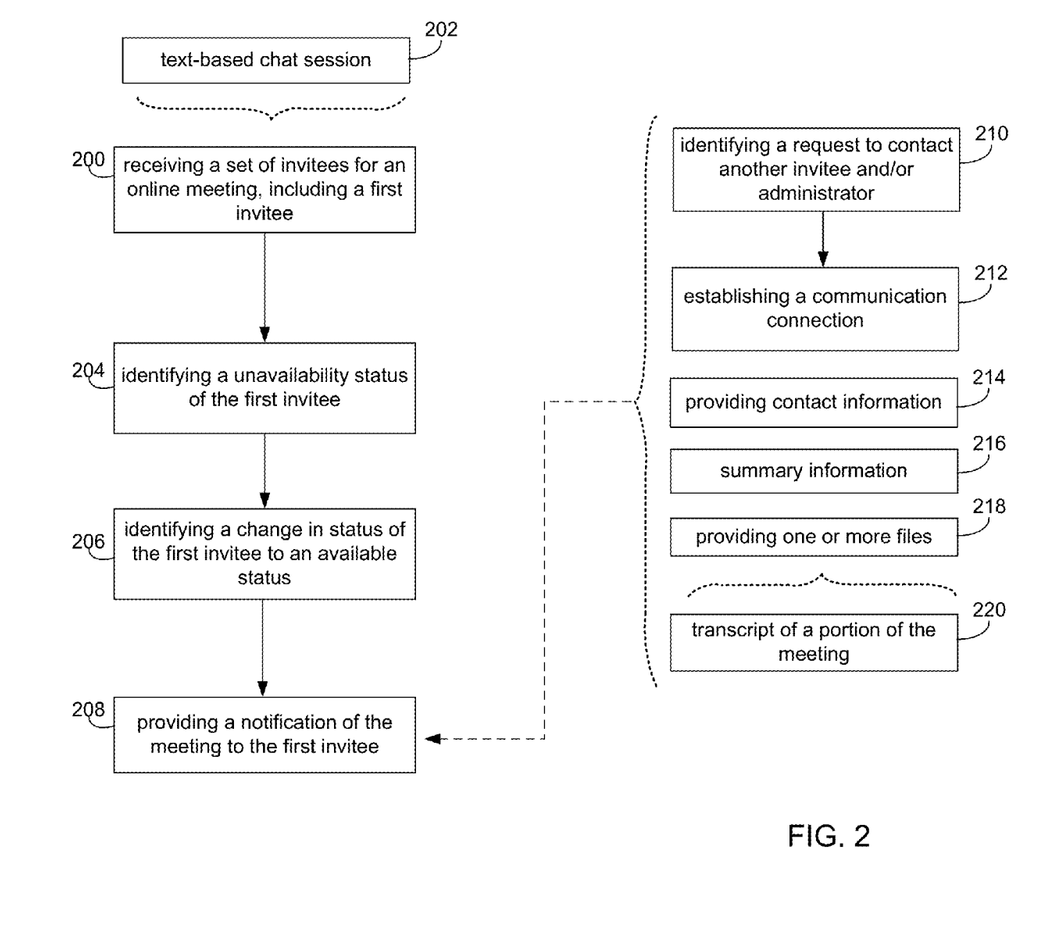
FIG. 2 is a flowchart of a process executed by the meeting notification process of FIG. 1.

Referring now also to FIG. 2, there is shown a diagrammatic view of an example process that may be implemented by an MN process, e.g., client MN process 20. Client MN process 20 may receive 200 a set of one or more invitees for an online meeting. For example, MN process 20 may receive from an administrator (e.g., who may include an organizer of an electronic meeting and/or a delegate of an organizer of an electronic meeting) a set of individuals (as designated, for example, by directory entries, screen names, email addresses, telephone numbers, IP addresses, and so on) that the administrator desires to invite to a meeting (e.g., a meeting including text-based chat session 202). In certain embodiments, such a set of invitees may be determined based upon information included in an invitation to the meeting (e.g., an instant messaging session invitation prepared, in whole or in part, by a meeting administrator and/or a separate process or individual). For example, an administrator may, using an instant messaging program, create an invitation to text-based chat session 202, specifying within the invitation the title (e.g., the main topic) of the session, the desired participants, the time at which the session will commence, and so on. In certain embodiments, MN process 20 may receive 200 a set of invitees (e.g., the desired participants) based upon submission (e.g., to the instant messaging application) of this invitation. Additionally/alternatively, a set of invitees may be received 200 by MN process 20 in a variety of other ways (e.g., based upon input by an administrator directly into MN process 20 and/or another process or application).

MN process 20 may identify 204 a first status of a first invitee included in the set of one or more invitees on the received 200 list. The identified 204 status of a particular invitee, at the time an invitation to the meeting is sent (or, for example, at the time the meeting is to commence), may indicate whether or not the invitee is able to view the invitation and/or is available to participate in the meeting. For example, an instant messaging application status may indicate that the invitee is currently offline (and therefore cannot receive instant messages) and/or is otherwise unavailable (e.g., is "busy," in "do not disturb mode," and so on). In certain embodiments, a status indicating unavailability (and/or availability) may be associated with a particular form of communication. For example, an invitee may be "online" (and/or otherwise "available") with respect general communication applications but may be currently "busy" or otherwise "unavailable" with respect to a particular instant messaging application (and/or other communication application). MN process 20 may identify 204 these and other statuses based upon communication with an EM application (e.g., a TBC application) and/or other receipt of information from other sources (e.g., other applications and/or user input from various invitees or other individuals).

MN process 20 may identify 206 a change in status of the first invitee. For example, an invitee with a previously-identified 204 status indicating unavailability (e.g., an "offline" status with respect to a particular EM application) may subsequently change his status (e.g., by coming "online" with respect to the particular EM application). MN process 20 may identify 206 this change (e.g., based upon information received from an EM application), which may, per the example above, indicate that the invitee is now available for a meeting.

It will be understood that an identified 206 change in status to a status indicating availability may not necessarily represent an identified change directly from the identified 204 unavailable status. In other words, an invitee may traverse various statuses between an originally identified 204 "unavailable" status and a subsequently identified "available" status. For example, MN process 20 may identify 204 that an invitee is offline when invitations to a meeting are being sent. Subsequently, for example, the invitee may come online but may remain unavailable (e.g., as indicated by a "do not disturb" status), before eventually becoming available for meeting communication (e.g., as indicated by an "available" status). As such, in certain embodiments, MN process 20 may identify 206 the change in status from unavailable to available regardless of intervening change from offline to online-but-unavailable.

In certain embodiments, an identified 206 change in status may occur after the start of the meeting (or a portion thereof). In certain embodiments, an identified 206 change in status may occur after the end of the meeting (or a portion thereof). As such, it will be understood that in certain embodiments a status indicating availability with respect to an electronic meeting may be obtained (i.e., a change to an available status may be identified 206) even after the electronic meeting has ended. In other words, an individual may be considered (e.g., based upon an identified 206 change in status) as "available" with respect to a meeting, even if he can no longer actually connect to the meeting because the meeting has ended. For example, if an electronic meeting is scheduled to occur using the functionality of an instant messaging application (i.e., via text-based chat), an invitee with an "online," "available" or other status indicating ability to send and receive text-based chats through the relevant instant messaging application (and/or various other applications) may be considered "available" with respect to the scheduled meeting, even if the meeting has already ended, because the invitee is available for communication in the form (and/or through the application) that was utilized by the meeting.

MN process 20 may provide 208 a notification of the meeting to the first invitee. For example, based upon identifying 206 a change in status of an invitee from unavailable (e.g., "offline") to available (e.g., "online"), MN process 20 may provide 208 a notification relating to the meeting to the invitee. In certain embodiments, such a notification may be provided 208, for example, utilizing the application (or process) providing meeting functionality. For example, if a meeting has been scheduled to utilize a text messaging application, MN process 20 may provide 208 a notification of the meeting via the text messaging application. In certain embodiments, a notification may additionally/alternatively be provided 208 using other applications or functionality. For example, continuing the discussion above, a notification regarding the instant messaging meeting may be provided via an instant messaging application and/or an email, voice over internet protocol ("VoIP"), calendar, or other application.

In certain embodiments, as noted above, the meeting may be ongoing when an invitee becomes available (i.e., as determined based upon, at least in part, an identified 206 change in the invitee's status). In such a case, for example, a provided 208 notification may include information and/or functionality that may facilitate the invitee joining the ongoing meeting, in addition/as an alternative to various other information and/or functionality.

In certain embodiments, the meeting may have ended when an invitee becomes available (i.e., as determined based upon, at least in part, an identified 206 change in the invitee's status). In such a case, a notification may not include information and/or functionality that may facilitate the invitee joining the meeting (i.e., because the meeting has ended) but may include various other information and/or functionality, as also discussed below.

As also noted above, a provided 208 notification may take various forms and may include various information and/or functionality. In certain embodiments, notifications and/or associated functionality may be provided 208 and/or executed automatically upon the occurrence of a triggering event (e.g., upon identifying 206 a change in status of an invitee from unavailable to available). In certain embodiments, notifications and/or associated functionality may be provided 208 and/or executed based upon, at least in part, user input. For example, various functionality facilitated by a provided 208 notification may be executed in response to an input from the invitee receiving/viewing the notification (e.g., in response to a mouse-click or other input associated with an action button, icon or other aspect of the provided 208 notification).

It will be understood that information and/or functionality described herein as "included in", "associated with" or "part of" a provided 208 notification (or the like) may be included in a display of the provided 208 notification (e.g., included as part of a provided 208 notification window) and/or may be made available via various other means associated with the provided 208 notification. For example, various information may be "included" in a notification via the inclusion of links or other functionality in the provided 208 notification, which may direct a user to such information when clicked, selected, and/or otherwise activated.

In certain embodiments, a provided 208 notification may facilitate communication between the invitee and a different invitee, meeting participant, and/or meeting administrator. (It will be understood, as used herein, that an administrator may be a participant in a meeting, another invitee who did (or did not) participate, a party responsible for scheduling, proctoring, or otherwise managing various aspects of a meeting, and so on.) In certain embodiments, MN process 20 may facilitate such communication even though, for example, the meeting may have already ended. For example, MN process 20 may identify 210 a request from the first invitee to contact a participant and/or administrator associated with the meeting. For example, MN process 20 may provide 208 a notification to the first invitee and, subsequently receive a user input from the first invitee via the provided 208 notification, the user input being associated with a request to communicate with another individual. In certain embodiments, for example, for a meeting conducted over a TBC application, MN process 20 may provide 208 a notification to an invitee who became available for text-based chat after the meeting ended a (e.g., may provide 208 a notification through the TBC application and/or otherwise). For example, the provided 208 notification may be a message window associated with the relevant TBC application that specifies that the recipient had been invited by a particular individual to a meeting regarding a particular subject, and that the meeting has now ended. Additionally/alternatively, the notification may include functionality (e.g., action buttons, icons, and so on) through which the recipient of the notification may request to be put into contact with an administrator of the meeting (e.g., the individual who initiated the meeting and sent the original invitations) and/or another individual associated with the meeting. In response to identifying 210 such a request, MN process 20 may establish 212 a communication connection between the invitee and a meeting participant, administrator, and/or other individual (e.g., directly or in conjunction with one or more other applications, such as a TBC application).

For example, based upon an invitee clicking a particular button in a provided 208 notification, MN process 20 may identify 210 that the invitee has requested a communication connection (e.g., a telephonic, email, text-based chat, or other connection) with another individual associated with the meeting (e.g., an administrator, such as the initiator of the meeting). Accordingly, MN process 20 may establish 212 (directly and/or in conjunction with another application or process, such as an EM application) a communication channel between the invitee and the individual. For example, MN process 20 may establish 212 (or cause to be established) an instant messaging window through which the invitee may send text-based chat messages to the individual. Additionally/alternatively, MN process 20 may establish 212 (or cause to be established) a voice-capable communication channel (e.g., a VoIP connection) between the invitee and the individual and/or various other communication channels.

In certain embodiments, in addition/as an alternative to establishing 212 a communication connection, MN process 20 may provide 214 (e.g., as part of a provided 208 notification) contact information associated with one or more other individuals associated with the meeting (e.g., an administrator and/or other invitees). For example, based upon an invitee clicking a particular button on (and/or otherwise engaging with) a provided 208 notification, MN process 20 may provide 214 to the invitee contact information regarding various individuals. In this way, for example, if the invitee is unable to communicate with an administrator of a meeting (or another invitee, and so on) at the current time, the invitee will nonetheless have easy access to appropriate contact information in order to communicate with the administrator (or other individual) at a different time.

In certain embodiments, a provided 208 notification may include summary information 216 associated with the meeting. For example, a provided 208 notification may include title information, subject matter information, duration information, participant information, information regarding the level of participation of various participants (e.g., the percent of the meeting occupied by input from various individuals), associated links (e.g., web-links, document links and so on), and various other summary information associated with the meeting. MN process 20 (and/or another process) may determine summary information in a variety of ways. For example, in certain embodiments, summary information may be provided by an administrator or other individual. For example, an administrator may input summary information such as title, key topics, invitees and so on when creating an invitation to a meeting. MN process 20 may provide this summary information 216 as part of a provided 208 notification.

In certain embodiments, summary information 216 may be determined automatically, at least in part. For example, in certain embodiments, semantic and/or other analysis of meeting content and associated information (e.g., as drawn from associated emails, text messages, and so on) in order to identify summary information 216. For example, semantic analysis of a transcript of an instant messaging meeting may indicate that the discussion focused on a few particular topics. This and other summary information 216 may be included as part of a provided 208 meeting notification. Similarly, MN process 20 may interoperate with an EM (and/or other) application in order to identify the summary information 216 such as amount of time the meeting required, to identify a list of actual attendees, and so on, and my provide such summary information 216 as part of a provided 208 notification.

In certain embodiments, MN process 20 may provide 218 to an invitee (e.g., as part of a notification) one or more files associated with the meeting. For example, based upon identifying 206 that a particular invitee has come online, MN process 20 may provide 208 a notification to the invitee. In certain embodiments, as part of this notification, MN process 20 may provide 218 one or more files (e.g., as attachments or links, and so on). Provided 218 files may include various files and file types, such as screenshots, presentation materials, attachments, emails, webpages, wikis, photos, spreadsheets, database records and so on.

In certain embodiments, for example, providing 218 files may include providing 218 transcript 220 of a portion of the associated meeting. For example, the transcript of a text-based chat the meeting (e.g., as recorded by a TBC application) may be provided 218 as part of a provided 208 notification, thereby facilitating an invitee who missed the meeting being able to easily review the meeting's subject matter and discussions.

MN process 20 may identify files to be provided 218 to participants (and/or others) in a variety of ways. For example, an administrator (or other individual) may designate certain files as relevant to a meeting (or portion thereof) as part of creating an invitation for the meeting and/or during the meeting (e.g., as such files are viewed, shared, discussed, and so on) or otherwise. Similarly, in certain embodiments MN process 20 may identify files to be provided 218 to participants (and/or others) based upon the files being shared among participants as part of the meeting, in communications related to the meeting (e.g., in an email following the meeting with a subject line related to the meeting), in team rooms, wikis or webpages associated with the meeting, and so on.

MN process 20 may provide 218 files (and/or may provide summary information 216) in a variety of ways. For example, in certain embodiments MN process 20 may provide 218 files as an attachment to a provided 208 notification (and/or as the provided 208 notification itself). In certain embodiments, MN process 20 may provide 218 files via a link or other reference associated with a provided 208 notification.

Figure 3:
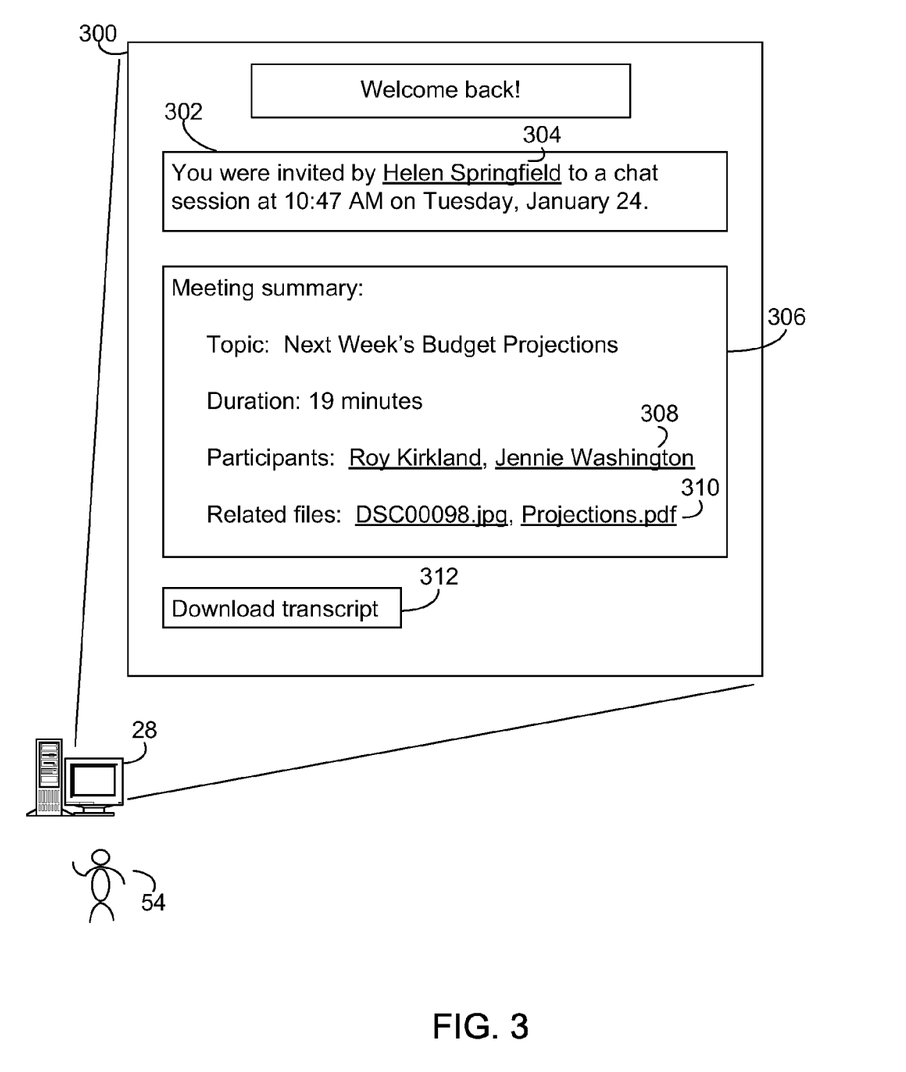
FIG. 3 is a diagrammatic view of an aspect of the meeting notification process of FIG. 1.

Referring now also to FIG. 3, an aspect of an implementation of MN process 20 is presented. For example, user 54 may have been invited to a meeting (e.g., a meeting to be conducted over an instant messaging application, such as TBC application 44), but may have been in an offline status when the meeting began. At a later time, user 54 may change her status from offline to online (e.g., may sign on to a TBC application, such as TBC application 44), which change may be identified 206 by MN process 20. In certain embodiments, user 54 may change her status to online after the meeting to which she was invited has ended. As such, user 54 may not be able to the attend the meeting to which she was invited, even though she is now available with respect to that meeting (i.e., has signed on to a relevant TBC application).

Based upon, at least in part, identifying 206 the change in status of user 54, MN process 20 may provide 208 a notification of the meeting. For example, MN process 20 may provide 208 notification window 300, which may include various information and/or functionality, on a display device associated with computing device 28. In certain embodiments, for example, notification window 300 may include information window 302, which may include, for example, the time the invitations was originally sent (i.e., 10:47 on January 24), the originator of invitation (i.e., Helen Springfield), the nature of the meeting (i.e., a chat session), and so on.

In certain embodiments, certain aspects of notification window 300 (and/or various sub-windows) may provide interactive functionality. For example, in certain embodiments, clicking (and/or otherwise activating) link 304 within information window 302 may cause a pop-up window to provide 214 contact information for the meeting initiator, Helen Springfield. Additionally/alternatively, by selecting link 304 user 54 may request a communication connection between herself and Helen Springfield, which connection may then be established 212 by MN process 20 (alone and/or in conjunction with various other applications or processes).

In certain embodiments, provided 208 notification window 300 may include meeting summary window 306, which may, for example, specify the topic of the meeting (e.g., as specified by the meeting initiator, as determined by semantic analysis of meeting content and discussions, and so on), the duration of the meeting, one or more other participants in the meeting, an invitee list (not shown), a list of files that are related to the meeting (e.g., files that were shared among participants, attached to the invitation, sent by a participant as follow-up after the meeting, and so on), and/or various other information.

In certain embodiments, certain aspects of meeting summary window 306 may provide interactive functionality. For example, in certain embodiments, clicking link 308 may cause a pop-up window to provide contact information for the participant Jennie Washington. Additionally/alternatively, by clicking link 308 user 54 may request a communication connection between herself and Jennie Washington, which connection may then be established 212 by MN process 20 (alone and/or in conjunction with various other applications or processes). Similarly, user 54 may, for example, request additional information regarding, and/or the download of, the file Projections.pdf by clicking link 310.

In certain embodiments, notification window 300 may additionally/alternatively include content and/or functionality relating to a meeting transcript. For example, MN process and/or another process or application (e.g., TBC application 52) may have compiled a transcript of the text-based chat meeting to which notification window 300 relates (i.e., the text-based chat session initiated by Helen Springfield at 10:47 AM on January 24). Accordingly, MN process 20 may provide 218 a transcript 220 of the meeting (e.g., by making the transcript available for viewing and/or download) based upon user 54 clicking on (or otherwise activating) action button 312.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
receiving, by one or more computing devices, a set of one or more invitees for an electronic meeting, the set of one or more invitees including a first invitee to receive an invitation for the electronic meeting;
identifying, by the one or more computing devices, a first status of the first invitee that indicates an inability for the first invitee to view the invitation for the electronic meeting via a communication application, wherein the first status is associated with an Instant Messaging application as the communication application;
identifying, by the one or more computing devices, a change in Instant Messaging status of the first invitee, after the end of the electronic meeting, to a second status that indicates an ability for the first invitee to view the invitation for the electronic meeting via the communication application;
providing, by the one or more computing devices, a notification of the electronic meeting to the first invitee after the end of the electronic meeting, based upon, at least in part, identifying the change in Instant Messaging status to the second status indicating the ability for the first invitee to view the invitation via the communication application, the notification provided to the first invitee via the communication application automatically based upon identifying the change in Instant Messaging status to the second status, the notification including a user interface feature for requesting a communication connection with an administrator of the electronic meeting; and
establishing a communication channel between the first user and the administrator in response to the first user invoking an action relative to the user interface feature.

2. The computer-implemented method of claim 1 wherein the electronic meeting includes a text-based chat session.

3. The computer-implemented method of claim 2 wherein the notification includes summary information associated with the electronic meeting.

4. The computer-implemented method of claim 2 further comprising:
providing one or more files associated with the electronic meeting to the first invitee, based upon, at least in part, identifying the change in status of the first invitee.

5. The computer-implemented method of claim 4 wherein the one or more files include a transcript of a portion of the electronic meeting.

6. The computer-implemented method of claim 2 further comprising:
providing, to the first invitee, contact information associated with one or more other individuals associated with the electronic meeting, based upon, at least in part, identifying the change in status of the first invitee.

7. The computer-implemented method of claim 1 wherein the first status that indicates the inability for the first invitee to view the invitation for the electronic meeting via the communication application is identified during at least one of when the invitation is sent to the first invitee and when the electronic meeting commences.

8. A computer program product residing on a non-transitory computer-readable storage medium having a plurality of instructions stored thereon, which, when executed by a processor, cause the processor to perform operations comprising:
receiving a set of one or more invitees for an electronic meeting, the set of one or more invitees including a first invitee to receive an invitation for the electronic meeting;
identifying a first status of the first invitee that indicates an inability for the first invitee to view the invitation for the electronic meeting via a communication application, wherein the first status is associated with an Instant Messaging application as the communication application;
identifying a change in Instant Messaging status of the first invitee, after the end of the electronic meeting, to a second status that indicates an ability for the first invitee to view the invitation for the electronic meeting via the communication application;
providing a notification of the electronic meeting to the first invitee after the end of the electronic meeting, based upon, at least in part, identifying the change in Instant Messaging status to the second status indicating the ability for the first invitee to view the invitation via the communication application, the notification provided to the first invitee via the communication application automatically based upon identifying the change in Instant Messaging status to the second status, the notification including a user interface feature for requesting a communication connection with an administrator of the electronic meeting; and establishing a communication channel between the first user and the administrator in response to the first user invoking an action relative to the user interface feature.

9. The computer program product of claim 8 wherein the electronic meeting includes a text-based chat session.

10. The computer program product of claim 9 wherein the notification includes summary information associated with the electronic meeting.

11. The computer program product of claim 9 wherein the operations further comprise:

providing one or more files associated with the electronic meeting to the first invitee, based upon, at least in part, identifying the change in status of the first invitee.

12. The computer program product of claim 11 wherein the one or more files includes a transcript of a portion of the electronic meeting.

13. The computer program product of claim 9 wherein the operations further comprise:

providing, to the first invitee, contact information associated with one or more other individuals associated with the electronic meeting, based upon, at least in part, identifying the change in status of the first invitee.

14. The computer program product of claim 8 wherein the first status that indicates the inability for the first invitee to view the invitation for the electronic meeting via the communication application is identified during at least one of when the invitation is sent to the first invitee and when the electronic meeting commences.

15. A computer system comprising:

one or more processor devices; and one or more memory architectures coupled with the one or more processor devices;

wherein the one or more processor devices are configured to:

receive a set of one or more invitees for an electronic meeting, the set of one or more invitees including a first invitee to receive an invitation for the electronic meeting;

identify a first status of the first invitee that indicates an inability for the first invitee to view the invitation for the electronic meeting via a communication application, wherein the first status is associated with an Instant Messaging application as the communication application;

identify a change in Instant Messaging status of the first invitee, after the end of the electronic meeting, to a second status that indicates an ability for the first invitee to view the invitation for the electronic meeting via the communication application;

provide a notification of the electronic meeting to the first invitee after the end of the electronic meeting, based upon, at least in part, identifying the change in Instant Messaging status to the second status indicating the ability for the first invitee to view the invitation via the communication application, the notification provided to the first invitee via the communication application automatically based upon identifying the change in Instant Messaging status to the second status, the notification including a user interface feature for requesting a communication connection with an administrator of the electronic meeting; and establish a communication channel between the first user and the administrator in response to the first user invoking an action relative to the user interface feature;

wherein the electronic meeting includes a text-based chat session.

16. The computer system of claim 15 wherein the notification includes summary information associated with the electronic meeting.

17. The computer system of claim 15 wherein the one or more processor devices are further configured to:

provide one or more files associated with the electronic meeting to the first invitee, based upon, at least in part, identifying the change in status of the first invitee.

18. The computer system of claim 17 wherein the one or more files includes a transcript of a portion of the electronic meeting.

19. The computer system of claim 15 wherein the one or more processor devices are further configured to:

provide, to the first invitee, contact information associated with one or more other individuals associated with the electronic meeting, based upon, at least in part, identifying the change in status of the first invitee.

20. The computer system of claim 15 wherein the first status that indicates the inability for the first invitee to view the invitation for the electronic meeting via the communication application is identified during at least one of when the invitation is sent to the first invitee and when the electronic meeting commences.

* * * * *